United States Patent [19]

Kosuge

[11] Patent Number: 4,881,610

[45] Date of Patent: Nov. 21, 1989

[54] GUIDE FOR HOT AIR FROM RADIATOR IN FOUR WHEELED VEHICLE OPERATED BY DRIVER IN SITTING POSTURE

[75] Inventor: Hideyoshi Kosuge, Hyogo, Japan

[73] Assignee: Kawasaki Jukogyo Kabushiki Kaisha, Japan

[21] Appl. No.: 136,545

[22] Filed: Dec. 22, 1987

[30] Foreign Application Priority Data

Dec. 27, 1986 [JP] Japan .......................... 61-200484[U]

[51] Int. Cl.$^4$ ........................ B60H 1/00; B60K 11/00
[52] U.S. Cl. ................................ 180/68.2; 180/69.24; 98/2.07; 98/2.08; 123/41.48; 237/12.3 A
[58] Field of Search ..................... 180/68.1, 68.2, 68.4, 180/69.2, 69.24; 123/41.48, 41.7, 198 E; 98/2.03, 2.05, 2.06, 2.07, 2.08; 237/12.3 A, 12.7

[56] References Cited

U.S. PATENT DOCUMENTS

| | | | |
|---|---|---|---|
| 2,397,792 | 4/1946 | Kramer et al. | 123/41.48 |
| 2,430,759 | 11/1947 | Crise | 180/68.2 X |
| 2,849,941 | 9/1958 | Negoro | 98/2.06 |
| 3,693,532 | 9/1972 | Colinet et al. | 98/2.08 |
| 4,564,081 | 1/1986 | Hamane et al. | 180/68.1 X |
| 4,573,544 | 3/1986 | Hoch et al. | 180/68.1 |
| 4,773,661 | 9/1988 | Kosuge | 280/152 R |

FOREIGN PATENT DOCUMENTS 61-66089 5/1986 Japan .

Primary Examiner—Charles A. Marmor
Assistant Examiner—Brian L. Johnson
Attorney, Agent, or Firm—Leydig, Voit & Mayer

[57] ABSTRACT

A four wheeled buggy operated by a driver in a sitting posture. A front body is mounted on an elongated main frame structure so as to cover a radiator mounted on the front end portion of the main frame structure. The front body includes a body upper member of a generally inverted U-shaped cross-section and a pair of generally inverted L-shaped cover members formed of elastic material. Each cover member has a top panel section connected to a corresponding one of a pair of side panel sections of the body upper member and located above a corresponding one of a pair of front wheels, and a side panel section depending from the top panel section. The side panel sections of the respective cover members are located between the front wheels respectively adjacent them. A plate member extending between the side panel sections cooperates therewith to define a guide passage for guiding hot air having passed through the radiator toward a driver's seat. An opening and closing member is movable between a closed position closing the guide passage and an open position opening the guide passage.

11 Claims, 7 Drawing Sheets

GUIDE FOR HOT AIR FROM RADIATOR IN FOUR WHEELED VEHICLE OPERATED BY DRIVER IN SITTING POSTURE

BACKGROUND OF THE INVENTION

The present invention relates to four wheeled vehicles, especially open-topped vehicles such as buggies employed for carrying loads on, for example, stock farms, farmland, wastelands and the like and, more particularly, to a guide for hot air from a radiator in a novel four wheeled buggy operated by a driver in a sitting posture.

In recent years, three or four wheeled buggies have been developed as vehicles suitable for running on stock farms, farmland, wastelands and the like. The three or four wheeled buggy is operated by a driver in a straddle posture like motorcycles, and steering of the buggy is effected by a steering bar. In this connection, reference should be made to Japanese Utility Model application Laid-Open No. 61-66089.

The above-mentioned buggy of straddle type is not easy to mount or dismount. In addition, operation of the steering bar is heavy because the buggy is run on stock farms, farmland, wastelands and the like which are violent in undulation or irregularity, so that operation for a long period of time tires a driver. Furthermore, only a slight load can be carried on the buggy. Moreover, it is impossible for the buggy to carry a person beside the driver.

In an attempt to eliminate the above-discussed problems, a four wheeled buggy operated by a driver in a sitting posture has been developed by the same applicant as that of the present application as disclosed in U.S. Ser. No. 69238 corresponding to Japanese patent application No. 61-163322. The buggy operated by a driver in a sitting posture is different in arrangement and disposition of the steering apparatus and the driving system from a four wheeled buggy of the straddle type. For this reason, a buggy operated by a driver in a sitting posture comprises a frame construction which is so arranged as to be suited for such steering apparatus and driving system. The frame construction is also arranged so as to be advantageous from the maintenance point of view, to be easy in getting on and off, to be able to carry a large load, and to permit a person to be carried beside the driver.

The frame construction of the above-described four wheeled buggy comprises an elongated main frame structure. A liquid-cooled engine is mounted on the main frame structure. A radiator mounted on a forward end portion of the main frame structure radiates heat from the engine cooling liquid to air passing through the radiator, thereby cooling the cooling liquid. A front body is mounted on the forward end portion of the main frame structure so as to cover the radiator.

During running of the buggy, hot air having passed through the radiator flows along an inner surface of the front body toward a driver's seat located rearwardly of the front body. During a hot season, the hot air flowing from the radiator toward the driver's seat makes the driver uncomfortable.

Reference should be made to U.S. Ser. No. 091,891 corresponding to Japanese Utility Model application No. 61-138039 filed in the name of the same applicant.

SUMMARY OF THE INVENTION

It is an object of the invention to provide a four wheeled buggy operated by a driver in a sitting posture, which can prevent hot air from a radiator from flowing toward a driver's seat during a hot season, but permit the hot air from the radiator to flow toward the driver's seat during a cold season.

According to the invention, there is provided a four wheeled buggy operated by a driver in a sitting posture, comprising:

an elongated main frame structure;

a pair of front wheels and a pair of rear wheels mounted respectively adjacent longitudinal front and rear end portions of the main frame structure;

a liquid-cooled engine mounted on the main frame structure;

a radiator mounted on the front end portion of the main frame structure for radiating heat from the engine cooling liquid to air passing through the radiator to cool the cooling liquid;

a front body mounted on the front end portion of the main frame structure so as to cover the radiator, the front body including a body upper member of a generally inverted U-shaped cross-section having a top panel section and a pair of side panel sections depending respectively from opposite sides of the top panel section and located respectively adjacent the pair of front wheels, and a pair of cover members formed of an elastic material and covering respectively the pair of front wheels, each of the cover members being of a generally inverted L-shape having a top panel section and a side panel section depending therefrom, the top panel section of each of the cover members being located above a corresponding one of the pair of front wheels and connected to a corresponding one of the pair of side panel sections of the body upper member, the side panel sections of the respective cover members being positioned between the pair of front wheels respectively adjacent them;

a driver's seat mounted on the main frame structure at a location rearwardly of the front body;

a plate member extending between the side panel sections of the respective cover members and cooperating with the side panel sections of the respective cover members to define a guide passage for guiding hot air having passed through the radiator toward the driver's seat; and opening and closing means movable between an open position where the opening and closing means opens the guide passage to permit the hot air having passed through the radiator to flow toward the driver's seat and a closed position where the opening and closing means closes the guide passage to prevent the hot air having passed through the radiator from flowing toward the driver's seat.

DETAILED DESCRIPTION

Figure 1:
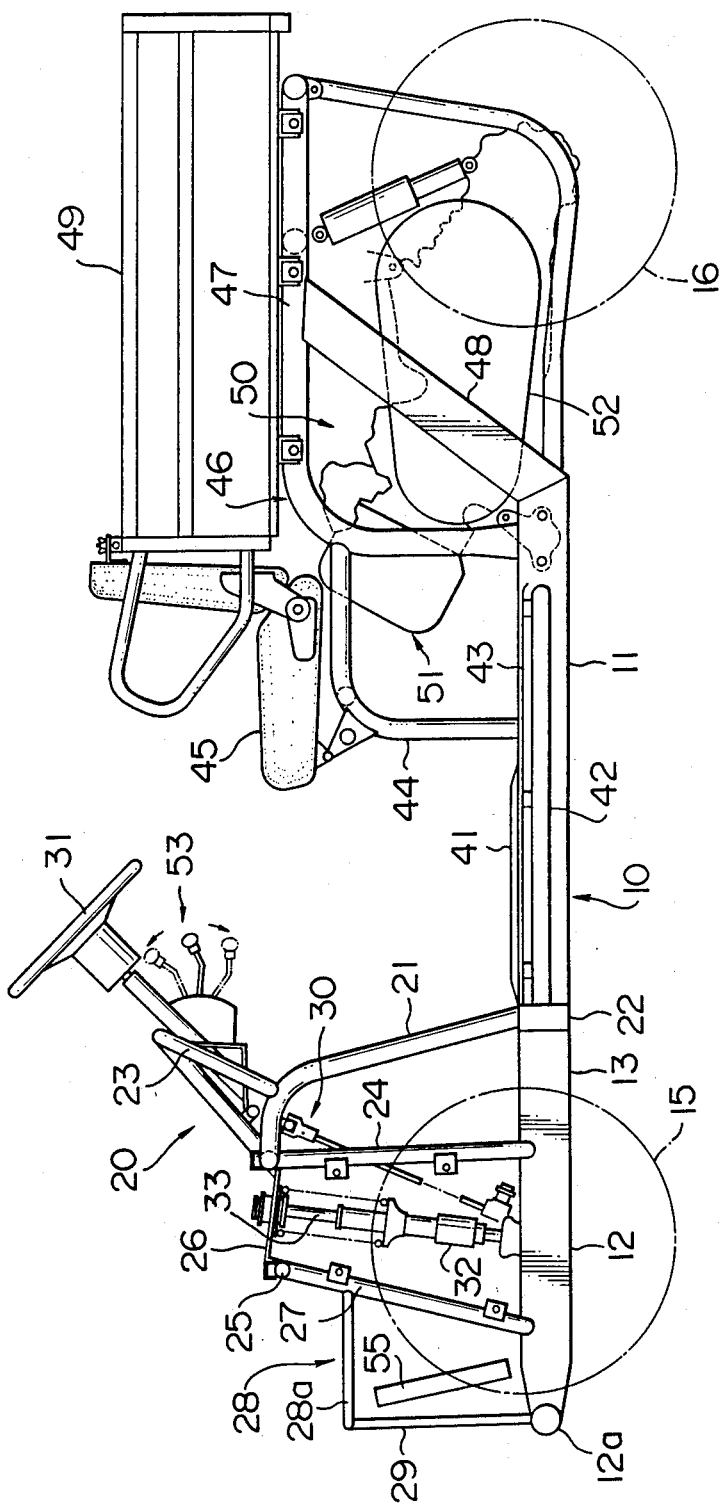
FIG. 1 is a side elevational view of a four wheeled buggy according to an embodiment of the invention, with a front body removed.
Figure 2:
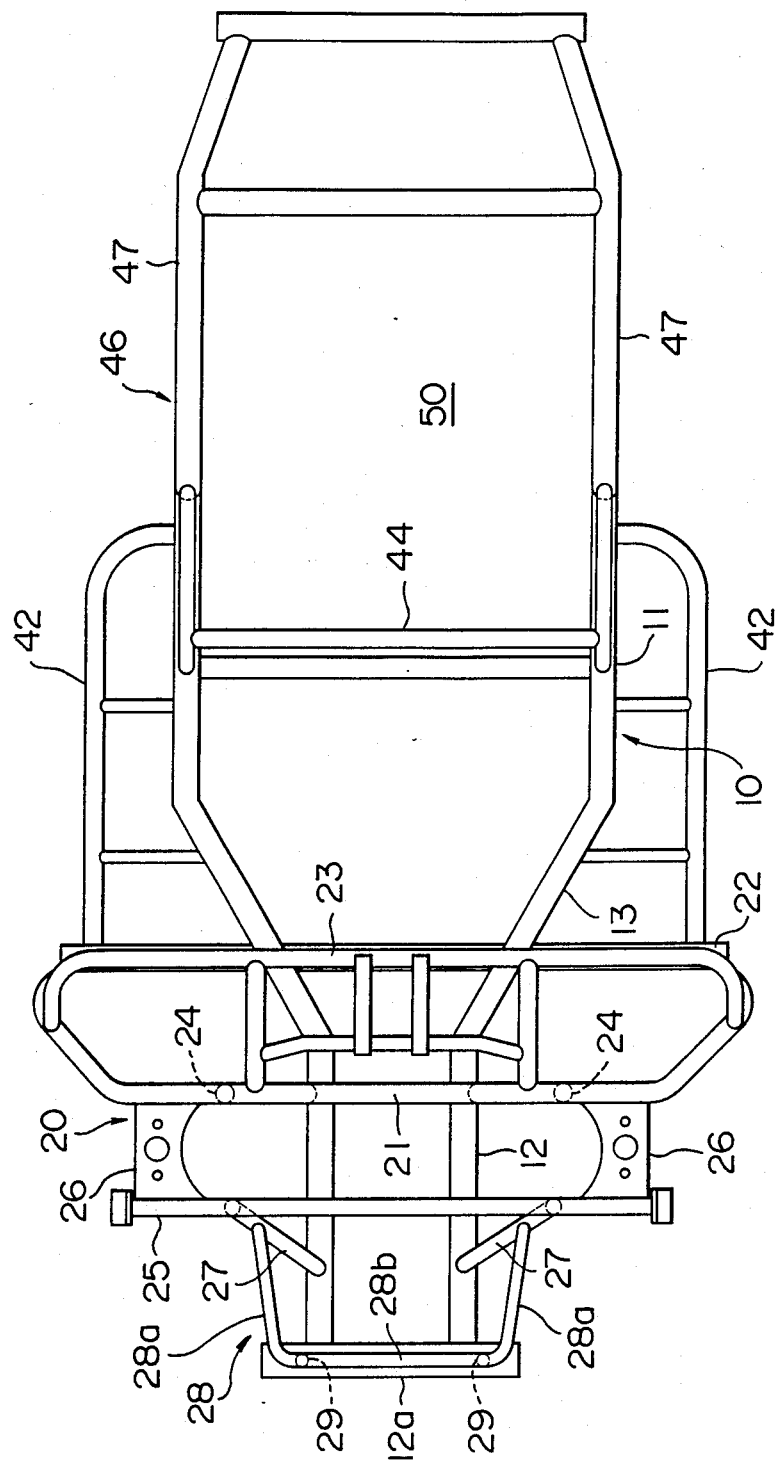
FIG. 2 is a top plan view of a frame construction illustrated in FIG. 1.

Referring to FIG. 1, there is shown a four wheeled buggy capable of being operated by a driver in a sitting posture, according to an embodiment of the invention. As will clearly be seen from FIG. 2, the buggy comprises an elongated flat main frame structure 10. The main frame structure 10 is composed of a generally rectangular body 11, a reduced-width longitudinal front end portion 12, and a connecting portion 13 between the body 11 and the front end portion 12. A pair of front wheels 15 (only one shown in FIG. 1) are mounted to the front end portion 12 of the main frame structure 10 through respective independent suspensions (not shown). A pair of rear wheels 16 (only one shown in FIG. 1) are mounted adjacent the opposite rear end of the main frame structure 10.

A support frame structure 20 comprises a rear pipe 21 generally in the form of an inverted U-shape having a pair of legs. The legs of the rear pipe 21 have their respective lower ends which are fixed respectively to opposite ends of a cross bar 22 fixedly mounted to the main frame structure 10. An upper pipe 23 generally in the form of an inverted U-shape has a pair of legs which have their respective lower ends fixed respectively to upper ends of the respective legs of the rear pipe 21. A pair of lower pipes 24 have their respective upper ends which are fixed to an upper horizontal portion of the rear pipe 21 respectively adjacent the opposite ends of the upper horizontal portion. Lower ends of the respective lower pipes 24 are respectively fixed to the opposite sides of the front end portion 12 of the main frame structure 10. An upper cross pipe 25 is spaced forwardly from the upper horizontal portion of the rear pipe 21 in parallel relation thereto. The upper cross pipe 25 is connected to the upper horizontal portion of the rear pipe 21 by a pair of end connecting plates 26. A pair of front suspension pipes 27 have their respective upper ends which are connected to the upper cross pipe 25 respectively adjacent the opposite ends thereof. The front suspension pipes 27 have their respective lower ends which are fixedly secured respectively to the opposite sides of the front end portion 12 of the main frame structure 10. A horizontally arranged, generally U-shaped lower cross pipe 28 has a pair of legs 28a having their respective free ends which are fixedly secured respectively to the front suspension pipes 27 adjacent their respective upper ends. The lower cross pipe 28 has a horizontally extending portion 28b which is supported, through a pair of vertical pipes 29, on a cross bar 12a fixed to the free end of the forward end portion 12 of the main frame structure 10.

A steering apparatus 30 having a steering wheel 31 is supported by the support frame structure 20. The steering apparatus 30 is operatively connected to the front wheels 15 for steering the same.

A pair of shock absorbers 32 each having a strut 33 have their respective upper ends which are fixedly mounted respectively to the pair of end connecting plates 26. Lower ends of the respective shock absorbers 32 are connected respectively to axles of the respective front wheels 15.

A floor plate 41 is fixedly mounted to the main frame structure 10 at a location rearwardly of the support frame structure 20. A pair of frames 42 for attachment of respective steps 43 are mounted to the main frame structure 10 so as to project laterally therefrom. Rearwardly of the floor plate 41, a seat attaching frame 44 is mounted to the main frame structure 10, and a driver's seat 45 is attached to the seat attaching frame 44. An engine attaching frame 46 is mounted at the rear end of the main frame structure 10 and extends rearwardly therefrom. The seat attaching frame 44 has a rear end connected to the engine attaching frame 46. The engine attaching frame 46 has a pair of horizontal portions 47 which are supported respectively by a pair of inclined frames 48 which are connected to the rear end of the main frame from structure 10. A carrier 49 is supported on the horizontal portions 47 of the engine attaching frame 46.

A liquid-cooled engine 51 and a transmission 52 are arranged within a space 50 defined by the seat attaching frame 44 and the engine attaching frame 46 so as not to project downwardly from the main frame structure 10. The engine 51 and the transmission 52 are supported by the engine attaching frame 46. The transmission 52 is operatively connected to a shift control apparatus 53 which is supported by the support frame structure 20 adjacent the steering wheel 31 of the steering apparatus 30.

A radiator 55 is mounted on the front end portion 12 of the main frame structure 10. Cooling liquid for the engine 51 is recirculated through the radiator 55. The radiator 55 radiates heat of the cooling liquid to air passing through the radiator 55, to cool the cooling liquid.

Figure 3:
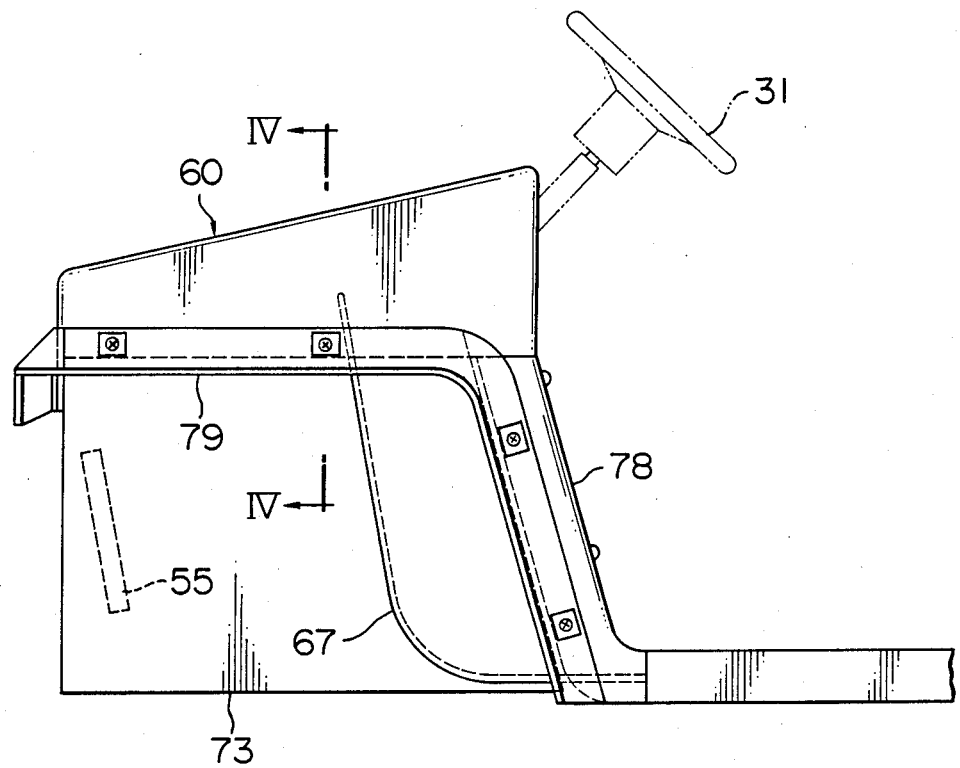
FIG. 3 is a fragmental side elevational view of the front body mounted to the buggy illustrated in FIG. 1.

As shown in FIG. 3, a front body 60 is mounted on the front end portion 12 of the main frame structure 10 so as to cover the steering apparatus 30 and the shock absorbers 32 to prevent mud from being splashed from the front wheels 15 on the steering apparatus 30 and the shock absorbers 32. The front body 60 also covers the radiator 55. In this connection, reference should be made to the aforementioned U.S. Ser. No. 091,891 corresponding to Japanese Utility Model application No. 61-138039.

Figure 4:
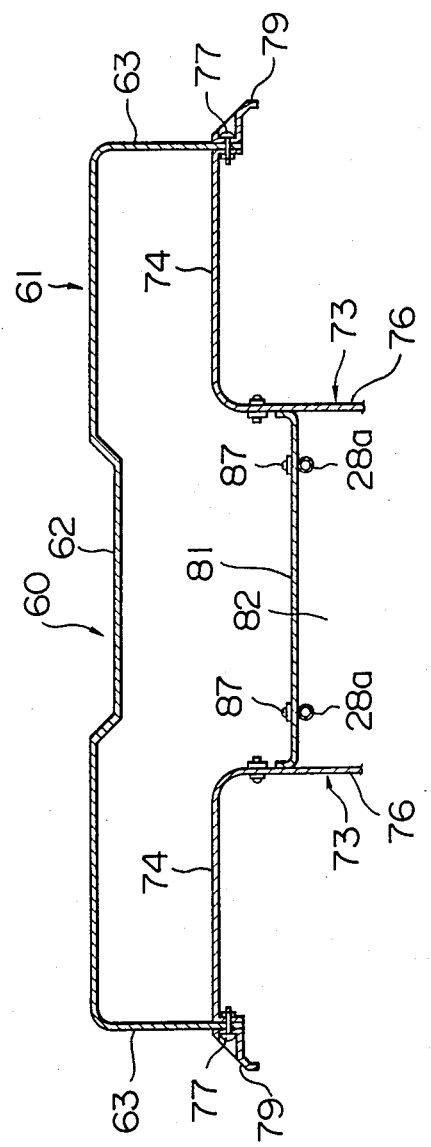
FIG. 4 is a cross-sectional view taken along line IV—IV in FIG. 3.
Figure 5:
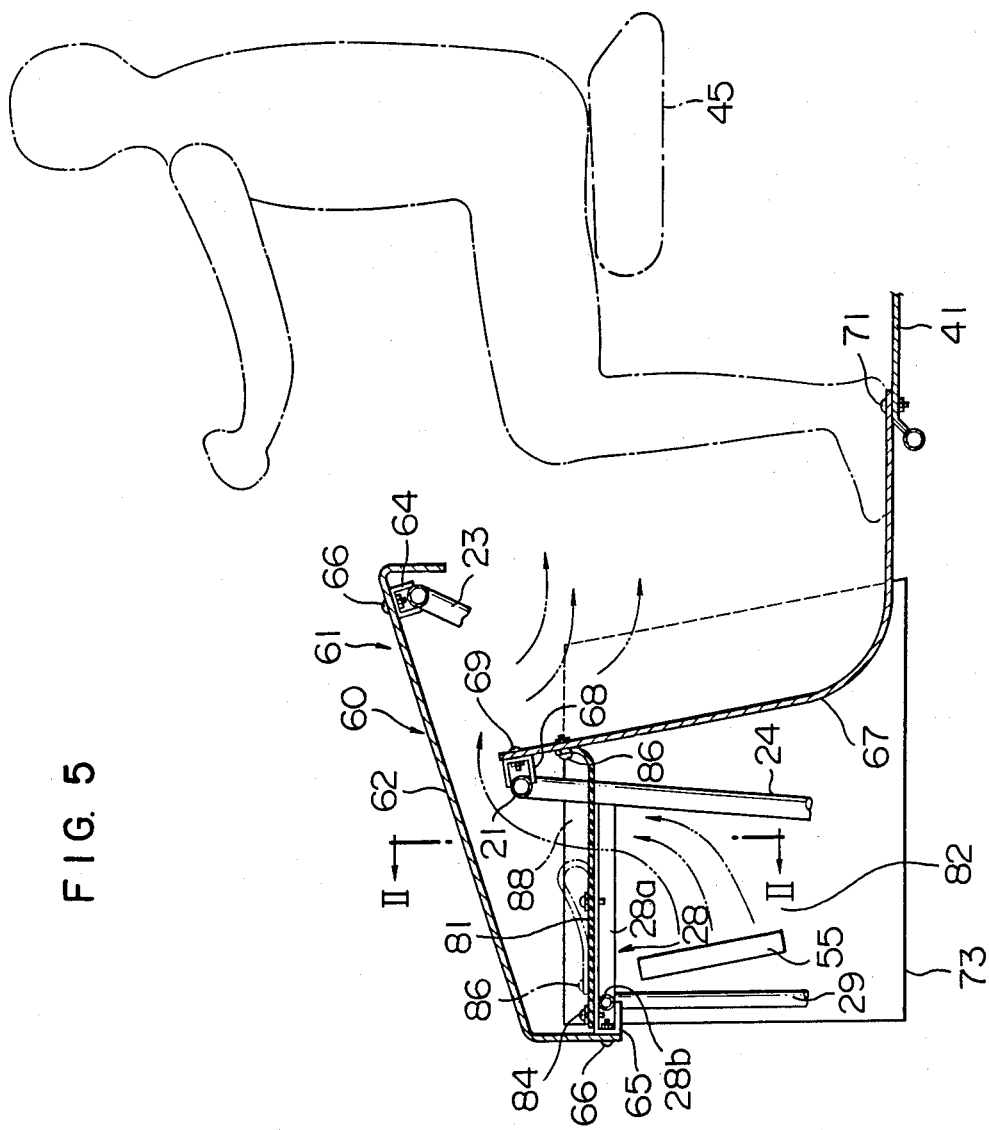
FIG. 5 is a longitudinal vertical crosssectional view of the front body illustrated in FIG. 3.

As clearly shown in FIG. 4, the front body 60 comprises a body upper member or upper body member 61 which has a generally inverted U-shaped cross-section having a top panel section 62 and a pair of side panel sections 63 depending respectively from opposite sides of the top panel section 62. The pair of side panel sections 63 are located respectively adjacent the pair of front wheels 15 shown in FIG. 1. As illustrated in FIG. 5, the top panel section 62 is inclined downwardly away from the driver's seat 45. The top panel section 62 is mounted to brackets 64 fixedly secured to the upper horizontal portion of the upper pipe 23 of the support frame structure 20 and to brackets 65 fixedly secured to the laterally extending portion 28b of the lower cross pipe 28, by means of respective screws 66. A front inner member 67, which has a generally L-shaped cross-section in the vertical plane and is convex forwardly in the horizontal cross-sectional plane, is positioned between the radiator 55 and the driver's seat 45. The front inner member 67 has a top end which is spaced downwardly from the inner surface of the top panel section 62 of the body upper member 61, to define an opening between the top end of the front inner member 67 and the top panel section 62. The top end of the front inner member 67 is mounted to a bracket 68 fixedly secured to a center of the horizontal portion of the lower pipe 21, by means of a screw 69. The front inner member 67 has a lower horizontal portion which is fixedly connected to the forward end of the floor plate 41 by screws 71, to serve as a part of the floor. As clearly shown in FIG. 4, a pair of cover members 73 each formed of an elastic material such as rubber and each having a generally L-shaped cross-section are associated with the body upper member 61 to cover respectively the pair of front wheels 15 illustrated in FIG. 1. Specifically, each cover member 73 has a top panel section 74 and a side panel section 76 depending therefrom. The top panel section 74 of each cover member 73 is located above a corresponding one of the front wheels 15 and is attached to a lower end of a corresponding one of the side panel sections 63 of the body upper member 61 by screws 77. The side panel sections 76 of the respective cover members 73 are positioned between the pair of front wheels 15 respectively adjacent them. Although not shown, front ends of the top panel sections 74 of the respective cover members 73 are fixedly mounted to the front end of the body upper member 61, and rear ends of the side panel sections 76 of the respective cover members 73 are fixedly mounted to the front inner member 67. As shown in FIG. 3, a pair of side panels 78 each having an L-shaped cross-section in the horizontal plane are connected respectively to flanges on respective side edges of the front inner member 67. A pair of fender flaps 79 are connected to the forward end of the body upper member 61, respective lower ends of the opposite side panel sections 63 and respective front ends of the side panels 78. Each fender flap 79 has a forward end bent inwardly and a rear end bent downwardly.

As shown in FIGS. 4 and 5, a plate member 81 formed of an elastic material such as heat-resistant rubber extends horizontally between the side panel sections 76 of the respective cover members 73, adjacent upper ends of the respective side panel sections 76. The plate member 81 cooperates with these side panel sections 76 to define a guide passage 82 illustrated in FIG. 5. The guide passage 82 extends from the radiator 55 toward the driver's seat 45 through the opening between the top panel section 62 of the body upper member 61 and the top end of the front inner member 67, so that hot air having passed through the radiator 55 can be guided by the guide passage 82 toward the driver's seat 45.

The above-mentioned plate member 81 has its forward end which is fixedly attached, by self tapping screw 84, to brackets 65 secured to the laterally extending portion 28b of the lower cross pipe 28. The rear end of the plate member 81 is detachably mounted to the front inner member 67 adjacent its top end by hooks 86. Opposite sides of the plate member 81 are fixedly mounted respectively to the pair of legs 28a of the lower cross pipe 28 by self tapping screws 87 as shown in FIG. 4.

The plate member 81 formed of an elastic material has an approximately rear half portion which is movable between a position indicated by the solid lines in FIG. 5 where the rear half portion is attached to the front inner member 67 by the hooks 86 to close the guide passage 82, and a position indicated by the dot-and-dash lines in FIG. 5 where the rear half portion is detached from the front inner member 67 and is folded back forwardly to form an opening 88 to thereby open the guide passage 82. In this manner, the rear half portion of the plate member 81 constitutes means for opening and closing the guide passage 82 i.e., a movable partition or door. When folded back forwardly, the rear half portion of the plate member 81 is adapted to provisionally be attached to the pair of legs 28a of the lower cross pipe 28 by the hooks 86 as indicated by the dot-and-dash lines in FIG. 5.

Guide for hot air from the radiator 55 in the buggy constructed as mentioned above will be described with reference to FIG. 5. When the buggy is run during a hot season, the rear half portion of the plate member 81 is attached to the front inner member 67 by means of the hooks 86 as indicated by the sold lines in FIG. 5, thereby closing the guide passage 82. During running of the buggy, hot air having passed through the radiator 55 flows downwardly along the front and bottom surfaces of the front inner member 67 toward a space below the main frame structure 10. Thus, the hot air having passed through the radiator 55 is prevented from flowing toward the driver's seat 45 through the guide passage 82. On the other hand, when the buggy is run during a cold season, the hooks 86 are removed from the front inner member 67 and the rear half portion of the plate member 81 is folded back forwardly as indicated by the dot-and-dash lines in FIG. 5. The rear half portion of the plate member 81 is provisionally attached to the pair of legs 28a of the lower cross pipe 28 by the hooks 86 to form the opening 88, to thereby open the guide passage 82. Thus, during running of the buggy, the hot air having passed through the radiator 55 can be guided toward the driver's seat 45 through the guide passage 82 and the opening 88.

Figure 6:
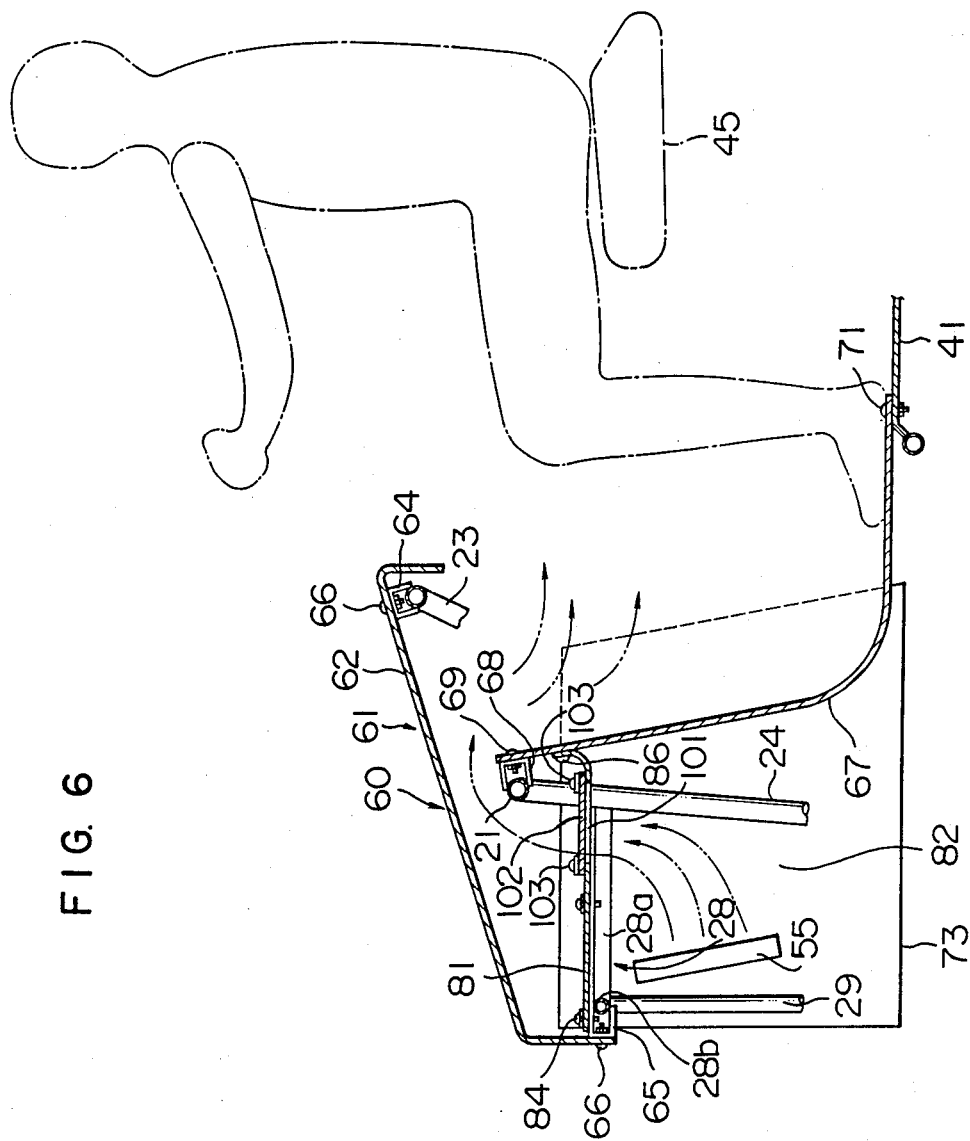
FIG. 6 is a view similar to FIG. 5, but showing another embodiment of the invention.
Figure 7:
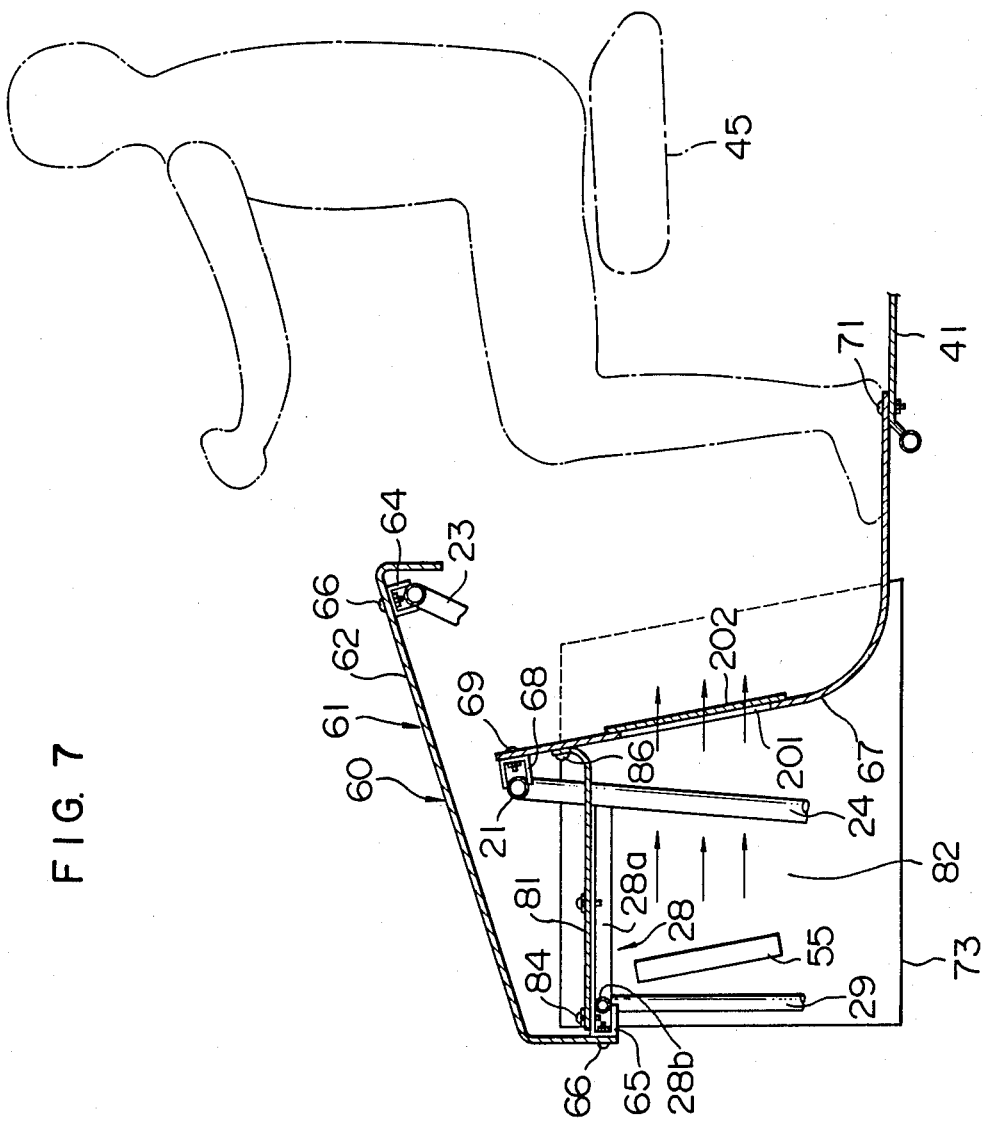
FIG. 7 is a view similar to FIG. 5, but showing still another embodiment of the invention.

FIGS. 6 and 7 show respectively other embodiments of the invention. In FIGS. 6 and 7, like reference numerals are used to designate like or similar components and parts like those shown in FIG. 5, and the description of such like or similar components and parts will therefore be omitted to avoid duplication.

In the embodiment illustrated in FIG. 6, the rear half portion of the plate member 81 is maintained fixed to the front inner member 67 by the fasteners or hooks 86. The plate member 81 is formed therein with a rectangular opening 101. The guide passage 82 extends toward the driver's seat 45 through the opening 101 and the opening between the top panel section 62 of the body upper member 61 and the top end of the front inner member 67. Means for opening and closing the guide passage 82 is constituted by a closure or lid 102 which opens and closes the opening 101. The lid 102 is provisionally attached to the plate member 81 by fasteners or hooks 103 in a detachable manner.

In the embodiment illustrated in FIG. 7, the rear half portion of the plate member 81 is maintained fixed to the front inner member 67 by the fasteners or hooks 86. The front inner member 67 is formed therein with a rectangular opening 201. The guide passage 82 extends toward the driver's seat 45 through the opening 201. Means for opening and closing the guide passage 82 is constituted by a door unit 202 formed of rubber which opens and closes the opening 201. The door unit 202 is mounted to the front inner member 67 by any suitable means, and is opened and closed in an accordion fashion or in a double door fashion. Alternatively, the door unit 202 may be detachably mounted to the front inner member 67 by means of fasteners such as hooks.

As described above, in the four wheeled buggy operated by a driver in a sitting posture according to the invention, the guide passage is closed when the buggy is run during a hot season to prevent hot air having passed through the radiator from flowing toward the driver's seat. Thus, it is possible to prevent the hot air from the radiator from blowing against the driver or a passenger to make them uncomfortable. On the other hand, when the buggy is operated during a cold season, the guide passage is opened to permit the hot air from the radiator to flow toward the driver's seat during running of the buggy, so that the driver and a person sitting beside him can warm themselves by the hot air, and the cold can be tempered.

What is claimed is:

1. A four wheeled vehicle operated by a driver in a sitting posture, comprising:
   an elongated main frame structure;
   a pair of front wheels and a pair of rear wheels mounted respectively adjacent longitudinal front and rear end portions of said main frame structure;
   a liquid-cooled engine mounted on said main frame structure;
   a radiator mounted on the front end portion of said main frame structure for radiating heat from engine cooling liquid to air passing through said radiator to cool the cooling liquid;
   a front body mounted on the front end portion of said main frame structure so as to cover said radiator, said front body including an upper body member of a generally inverted U-shaped cross-section having a top panel section and a pair of side panel sections depending respectively from opposite sides of said top panel section and located respectively adjacent said pair of front wheels, and a pair of cover members formed from an elastic material and covering respectively said pair of front wheels, each of said cover members being of a generally inverted L-shape having a top panel section and a side panel section depending therefrom, the top panel section of each of said cover members being located above a corresponding one of said pair of front wheels and connected to a corresponding one of said pair of side panel sections of said upper body member, the side panel sections for the respective cover members being positioned between said pair of front wheels respectively adjacent them;
   a driver's seat mounted on said main frame structure at a location rearward of said front body;
   a plate member extending between the side panel sections of the respective cover members and cooperating with the side panel sections of the respective cover members to define a guide passage for guiding hot air having passed through said radiator toward said driver's seat; and
   a partition movable between an open position where said partition opens said guide passage to permit the hot air having passed through said radiator to flow toward said driver's seat and a closed position where said partition closes said guide passage to prevent the hot air having passed through said radiator from flowing toward said driver's seat.

2. A four wheeled vehicle as defined in claim 1, wherein said front body includes a front inner member located between said radiator and said driver's seat, said front inner member having a top end thereof spaced downwardly from an inner surface of said to panel section of said upper body member of said front body to define an opening between said top end of said front inner member and said top panel section of said upper body member, said guide passage extending through said opening,
   wherein said plate member is formed from an elastic material and is yieldable, and said partition comprises a rear end portion of said yieldable plate member adjacent said driver's seat, the rear end portion of said yieldable plate member being releasably attached to said front inner member to move said opening and closing means to said closed position and being detached from said front inner member and folded back away from said driver's seat to move said opening and closing means to said open position.

3. A four wheeled vehicle as defined in claim 2, wherein said plate member is formed of a heat-resistant rubber.

4. A four wheeled vehicle as defined in claim 1, wherein said front body includes a front inner member located between said radiator and said driver's seat, said front inner member having a top end thereof spaced downwardly from an inner surface of said top panel section of said upper body member of said front body to define an opening between said top end of said front inner member and said top panel section of said upper body member, said guide passage extending through said opening,
   wherein a rear edge of said plate member adjacent said driver's seat is fixedly mounted to said front inner member, said plate member having formed therein an opening through which said guide passage extends, and said partition comprises a closure member detachably mounted in said opening in said plate member.

5. A four wheeled vehicle as defined in claim 1, wherein said front body includes a front inner member located between said radiator and said driver's seat, said front inner member having formed therein an opening through which said guide passage extends, and
   wherein said partition comprises a door mounted in said opening in said front inner member for opening and closing said opening.

6. A four wheeled vehicle as defined in claim 5, wherein said door is formed of rubber.

7. A four wheeled vehicle as defined in claim 1, wherein said plate member is mounted substantially horizontally to the side panel sections of the respective cover members adjacent upper ends of said panel sections of the respective cover members.

8. A four wheeled vehicle as defined in claim 1, wherein said top panel section of said upper body member is inclined downwardly away from said driver's seat.

9. A four wheeled vehicle as defined in claim 1 wherein said guide passage extends transversely of the vehicle between the side panel sections of the respective cover members.

10. A four wheeled vehicle as defined in claim 1 wherein said movable partition is a sole partition for opening and closing said guide passage.

11. A four wheeled vehicle as defined in claim 1 wherein said plate member is formed from an elastic material.

* * * * *